June 10, 1930.  A. L. BAUSMAN  1,763,084
FEEDING APPARATUS FOR CONFECTIONERY MACHINES
Filed July 14, 1927  3 Sheets-Sheet 1

INVENTOR.
Alonzo Linton Bausman
BY Chapin + Neal
ATTORNEYS.

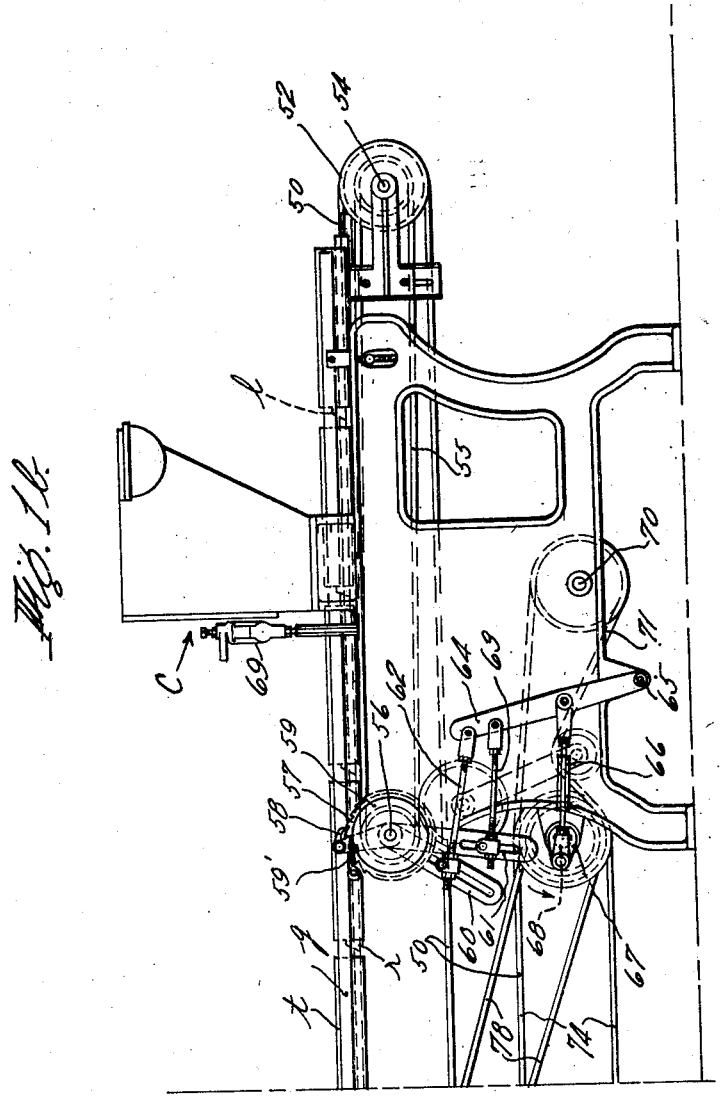

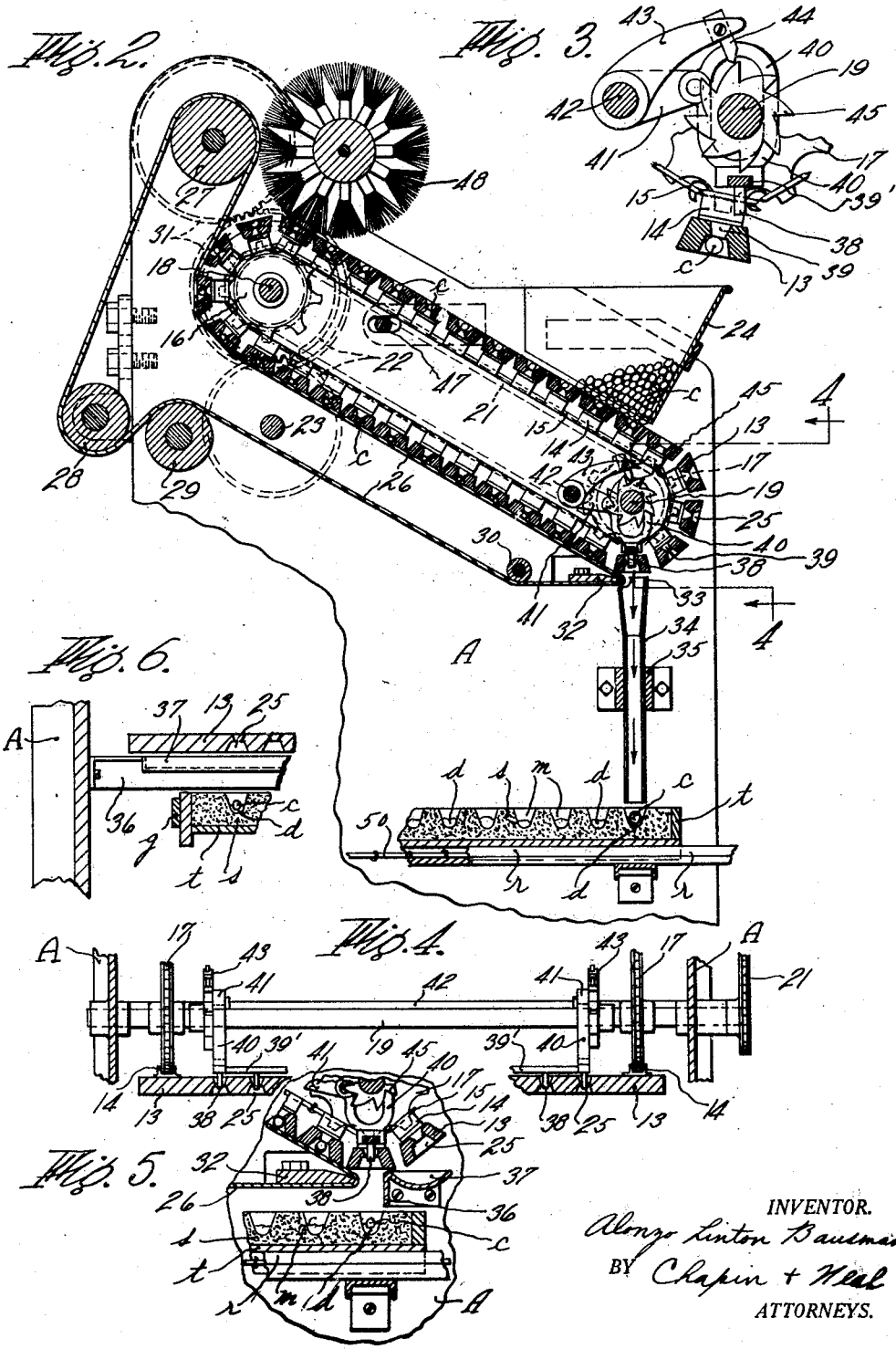

Patented June 10, 1930

1,763,084

UNITED STATES PATENT OFFICE

ALONZO LINTON BAUSMAN, OF SPRINGFIELD, MASSACHUSETTS, ASSIGNOR TO NATIONAL EQUIPMENT COMPANY, OF SPRINGFIELD, MASSACHUSETTS, A CORPORATION OF MASSACHUSETTS

FEEDING APPARATUS FOR CONFECTIONERY MACHINES

Application filed July 14, 1927. Serial No. 205,816.

This invention relates to mechanism for feeding articles in rows to a carrier and, more especially, to such a mechanism as is adapted to feed cherries, nuts and the like which are to be covered with confectionery material.

The invention also relates to improvements in feeding mechanism of the general type disclosed in my copending application, Serial No. 125,822, filed July 29, 1926. That mechanism was disclosed in an adaptation, wherein rows of cherries were fed into rows of small mold recesses formed in a body of starch contained in a tray, while the trays were in motion. In that mechanism the cherries were deposited in the molds prior to the deposit of any confectionery material therein.

The present invention, while not limited in all its aspects thereto, contemplates the interposition of the feeding mechanism between two depositors in such a manner that the molds are first filled with a small amount of cream or other desired confectionery material, the cherries are then deposited on the cream deposits, preferably in such a way that the cherries become partially embedded in the cream, and finally the remainder of each mold is filled with a second deposit of cream or the like to cover the top and sides of the cherry. This arrangement is designed to produce molded and cherry-filled cream centers suitable for subsequent coating with chocolate or the like.

The invention is directed mainly to improvements which insure that the cherries, or other articles, will be deposited with certainty and accuracy in their molds. Cherries are chosen as an illustrative example because, by reason of their sticky nature, they are notoriously difficult to handle.

More particularly, the invention has for objects; the provision of positively-acting means for expelling the cherries from the cherry conveyer and starting them with certainty on their flights toward the receiving molds; the provision of means which will prevent diversion of the cherries from their proper and contemplated paths of flight toward the receiving molds, due to the momentum which the cherries acquire while moving with the cherry conveyer; the provision of means for guiding the cherries during their flight in case the same are to drop from a substantial height above the receiving molds in order to cause the cherries to become embedded in the cream deposits; and the provision of improved driving means for the cherry feeding mechanism whereby the feeding of the cherries may be made to occur while the receiving molds are at rest and substantially at the same time that the cream deposits are made.

These several features are capable of use separately or in conjunction. Each, however, contributes to the desired result of securing with surety and certainty the feeding of articles, even those of a difficult nature such as cherries, in rows to a conveyor or to rows of molds carried by a conveyor. Consequently, the full advantages of the invention are secured by the use of the several features conjointly although, since a substantial measure of advantage results from the use of each feature, they may be used separately and I intend to cover each feature independently of the other.

The aforesaid and other objects will appear in the following description and will be pointed out in the appended claims.

The invention will be disclosed with reference to the accompanying drawings, in which:—

Figs. 1ª and 1ᵇ, when joined together end to end along the dot-dash line, present a side elevational view of an apparatus, wherein the cherry feeder is interposed between and coordinated with, two cream depositors to accomplish the work above outlined;

Fig. 2 is a fragmentary sectional elevation showing the cherry feeder alone and its relationship with the receiving molds and mold conveyer;

Fig. 3 is an enlarged view of a portion of Fig. 2, showing the positively-acting means for expelling the cherries from the cherry conveyer;

Fig. 4 is a fragmentary cross sectional view taken on the line 4—4 of Fig. 2;

Fig. 5 is a fragmentary view, taken similarly to Fig. 2 and showing a modification; and Fig. 6 is a fragmentary view taken at right angles to and from the right hand end of Fig. 5.

Figure 1A:
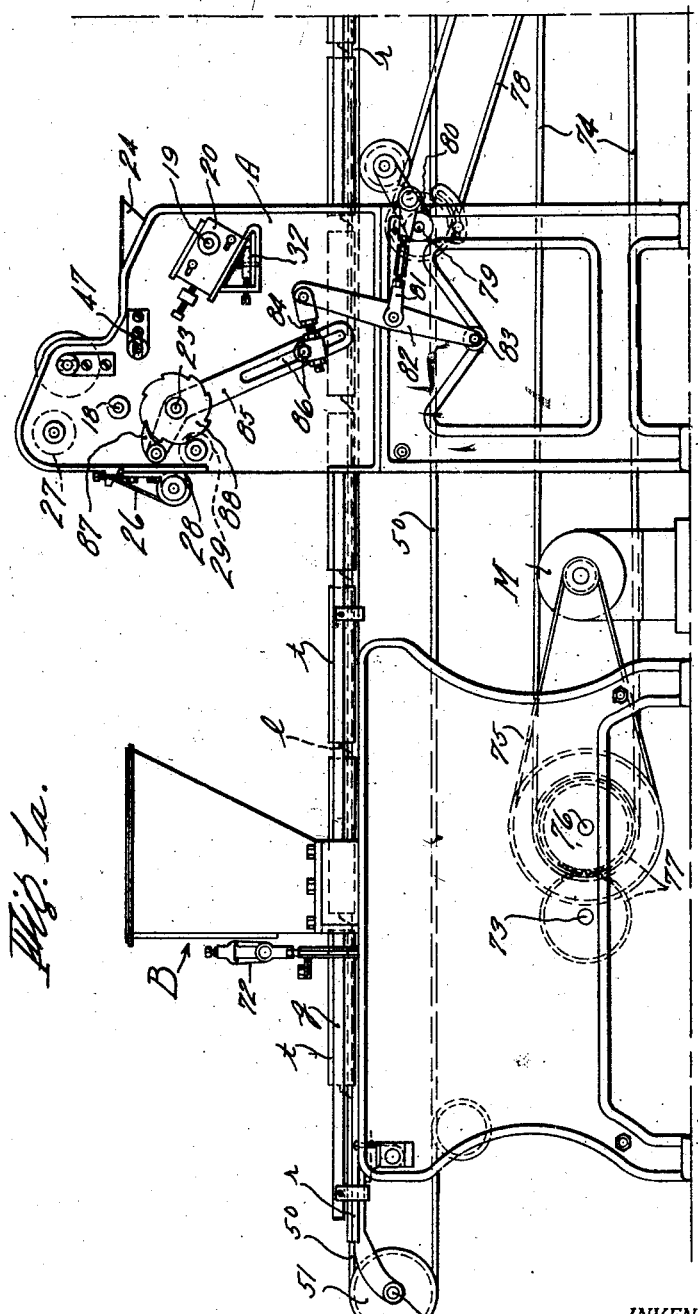

Referring to these drawings and particularly to Fig. 2, the feeding device is constructed along the same general lines as that disclosed in my copending application, above identified. It is adapted to feed articles, such as cherries $c$ for example, into rows of molds $m$, formed in a body of starch $s$, contained in a tray $t$, which is moved below the feeding device in a manner later to be described.

The cherry feeding device includes a conveyer made up of a series of transverse slats 13, which are fixed near their ends to lugs 14 formed on the links of a sprocket chain 15. A pair of these chains are used, each being trained over upper and lower sprockets 16 and 17, respectively. The sprockets 16 are supported by, but free to turn, on a shaft 18 while the sprockets 17 are fixed to a shaft 19. These shafts 18 and 19 are rotatably supported near their ends in a pair of laterally spaced side frames A, which also serve to support all other parts of the cherry feeding mechanism. The shaft 19 is preferably supported from frames A through the intermediary of adjustable brackets 20 (Fig. 1ª), whereby the tension of the cherry conveyer may be adjusted in an obvious manner. The shafts 18 and 19 are connected by a chain 21 and suitable sprockets and shaft 18 is connected by spur gearing 22 to a main drive shaft 23. Thus the conveyer is driven from shaft 19 which in turn is driven from drive shaft 23 by the gears 22 and the sprocket chain 21. In my prior application, the gearing between shafts 18 and 23 was such as to produce intermittent movement of the former, while in this case these two shafts turn in unison and drive shaft 23 is intermittently actuated by a different mechanism later to be described.

The conveyer, like that shown in the copending application, above referred to, travels beneath a hopper 24, which contains a supply of the cherries or other articles to be fed. The slats 13 have pockets 25 therein, into which the cherries gravitate or roll as the conveyer moves beneath the hopper. The conveyer in its upper stretch travels in an upwardly inclined path and, as it commences to turn around sprockets 16, meets a belt 26 which tightly hugs the outer faces of the slats during their lower stretch of travel and prevents the cherries from dropping out of pockets 25. Belt 26 is trained around a driving roll 27, a tension roll 28 and idler rolls 29 and 30. All of these rolls are supported in frames A and roll 27 is driven by spur gearing 31 from the shaft 18, above described. Belt 26 is also trained around the thin edge of a bar 32, which extends across between the side frames A and at its ends is mounted thereon for longitudinal adjustment, as indicated in Fig. 1ª. The bar 32 forces belt 26 to turn a sharp corner and quickly uncover a row of pockets 25 and it is so adjusted that, as each slat successively reaches a position in which its pockets are upside down and in which the axes of such pockets are vertical, these pockets are uncovered to allow the cherries therein to fall.

A feature of the present invention consists in the provision of means for counteracting the effect of the momentum which the cherries acquire from the moving cherry feeding conveyer and insuring that such momentum cannot cause the cherries to be diverted from the intended paths of travel. When the cherry feeding conveyer suddenly stops, the cherries tend to continue in motion and if they have started to fall when the conveyer stops, they may be carried forwardly somewhat and not drop in the desired vertical paths which are coincident with the vertical axes of the pockets. To insure the desired result, I provide a stationary barrier or barriers adjacent the lower stretch of travel of the conveyer and just slightly forwardly of the desired paths of fall of the cherries. In Fig. 2, an individual barrier 33 is provided for each pocket 25 of the transverse row of pockets, these barriers being formed as upward extensions of a transverse row of vertically disposed tubes 34 secured in a cross bar 35 fixed at its ends to frames A. The upper ends of the tubes are bellmouthed and the barriers 33 force the cherries to fall into the enlarged open upper ends of the tubes and through the latter into the molds $m$. These tubes are, or may be, used where it is desired to have the cherries fall through a considerable distance, as for example to cause the cherries by their fall to become indented in deposits of cream $d$ or the like, previously made in molds $m$. Where the tubes are not necessary or desired, the deflector may take the form of a simple cross bar, such as that shown in Figs. 5 and 6 at 36. The bar 36, which is secured at its ends to frames A, may also be fashioned to afford a trough 37 to catch any drip from the pockets 25 as the conveyer carries them away from cherry-releasing position, thereby preventing the drip from wetting the starch $s$ in the underlying tray $t$.

In my copending application, each slat 13 was rapped when it moved into cherry-delivering position in order to cause the sticky cherries, which frequently adhere to the walls of pockets 25, to drop. In the present case, I prefer to provide means which positively ejects the cherries from the pockets and I have shown in Figs. 2, 3 and 4 one example of many expedients which may be adapted to secure the ejecting function. A series of ejector pins 38 are provided which are equal in number to the pockets 25 in each slat 13 and are designed, when the slat moves into cherry discharging position, to enter the pockets through openings 39, as indicated in Fig. 2, in the back of the slat and poke the cherries out of the pockets, even if they are stuck thereto. These ejector pins 38 are fixed to and depend from a cross bar 39' which is secured at its ends to a pair of O-shaped pieces 40 through which the shaft 19, above described, freely passes. The pieces 40 are pivotally connected to the free ends of arm 41 fixed to a shaft 42, mounted at its ends in frames A for turning movement. Also fixed to shaft 42 are arms 43 carrying pawls 44 which rest upon ratchets 45 fixed to shaft 19. There are as many teeth in each ratchet 45 as there are teeth in each sprocket 18 so that each time that a slat 13 moves toward and into cherry discharging position, the ratchets first cause the ejector pins to be elevated and then to suddenly drop at or about the time when the slat comes to rest in cherry discharging position. The O-shaped pieces 40, which encompass shaft 19, have freedom for considerable swinging movement in a counterclockwise direction as viewed in Fig. 3 so that they can move with the slat 13, in which their ejector pins are lodged, long enough to permit the ratchet to withdraw the pins from the slats. After such withdrawal, the pieces 40 swing back until they come into position to enter the hole in the next slat 13 as the latter moves into cherry discharging position.

In the drawings, I have indicated the agitator 47 and the brush 48 shown in connection with the feeding device of my copending application. The agitator and brush are constructed and mounted and arranged to operate in the same manner as disclosed in said application and need not be described in detail herein. The brush and agitator may in fact be dispensed with for although they are desirable refinements, they are not absolutely essential to the successful operation of the machine.

In the particular use of the invention illustrated, the cherry feeder is disposed between two depositors B and C, as distinguished from the machine of my copending application, in which the cherry feeder was disposed between a machine, which filled the trays with starch and formed molds therein, and a depositor. The trays $t$ with the mold $m$ formed in the starch therein may be delivered from the mold forming machine to the depositor B in the usual way, being received upon runways $r$ which serve to support the trays while they are carried successively beneath the first depositor, the cherry feeder and the second depositor. The usual side guides $g$ are provided to guide the trays laterally. Each runway $r$ is provided with a longitudinal groove to receive and support a chain 50 (Fig. 2), which is provided at suitable intervals with lugs $l$ to engage and move trays $t$. Each chain 50 is trained on two sprockets 51 and 52. The pair of sprockets 51 are secured to an idler shaft 53 mounted in the frame of depositor B, while the pair of sprockets 52 are fixed to a shaft 54 supported from the frame of depositor C. Shaft 54 is driven by a chain 55 from a shaft 56 on depositor C. Shaft 56 is driven intermittently, in the usual manner by pawl and ratchet mechanism, so that the trays $t$ are first moved by a series of small steps, equal in number to the number of molds $m$ and equal in length to the longitudinal distance between the rows of molds $m$, and then by a longer step equal in length to the distance between the end row of molds in one tray and the adjacent end row of molds in the adjacent tray. Such pawl and ratchet mechanism is well known in the art and, being essentially like that disclosed in my U. S. Patent No. 1,169,602, dated January 25, 1916, will require but brief description herein. It includes a ratchet 57 fixed to shaft 56 and a pawl 58 for cooperation therewith to produce the small steps of tray movement and a notched disc 59 and a pawl 59' having a greater throw than pawl 58 and adapted at proper times to produce the large step of tray movement. The pawls 58 and 59' are pivotally connected to the upper ends of levers 60 and 61, respectively, which are both supported intermediate their ends on shaft 56 and are free to turn thereon. Levers 60 and 61 are connected by links 62 and 63, respectively, to a common lever 64, which is pivoted at 65 to the frame of depositor C and is connected by a link 66 to an actuating crank 67. The latter is fixed to a shaft 68 mounted in said frame.

The pump mechanism of depositor C, indicated conventionally at 69, is driven in the usual manner (not shown) from a shaft 70, and reference is made to said patent for a disclosure of such driving means. Shaft 70 is driven by a chain 71 from shaft 68 and the arrangement is such that the pump mechanism operates while the tray feeding means is at rest. In the drawings, the tray feeding means is shown at the end of an increment of feeding movement. Similarly the pump mechanism 72 of depositor B is driven from a similar shaft 73 which is driven by spur gears 77 from a shaft 76 to turn at equal speed. The shaft 76 is connected by a chain 74 to shaft 68 so that the pumping mechanisms 69 and 72 operate simultaneously and while the trays $t$ have come to rest. The connected shafts 68, 70 and 73 may be driven in any suitable manner, as by a motor M which drives by a belt 75 the described shaft 76.

The cherry feeder or depositor A is likewise driven from shaft 68 and in such a manner that the deposit of the cherries is effected while the trays $t$ are at rest and during the interval in which the deposits of cream are made by the depositors B and C. As shown, shaft 68 is connected by a chain 78 to drive a shaft 79 mounted in the frame A. On shaft 79 is fixed a crank 80 which is connected by a link 81 (preferably adjustable as to length as indicated) to oscillate a lever 82, pivoted to frame A at 83. Lever 82 is connected by a link 84 to the lower end of a lever 85, which is mounted intermediate its ends to turn freely on the described drive shaft 23 of the cherry depositor. Link 84, which like link 81 is preferably adjustable as to length, is connected by a bolt and slot connection 86 to lever 85, whereby the throw of the latter may be varied. The upper end of lever 85 carries a pawl 87 to cooperate with a ratchet 88 fixed to shaft 23. The number of teeth on ratchet 88 corresponds with the number of teeth on sprockets 16 and 17 and the transmission between shafts 23, 18 and 19 is such that when ratchet 88 is turned through an angle equal to that subtended by one tooth, the cherry feeding slats 13 will be moved through a distance equal to the center to center distance between adjacent slats. Thus, each revolution of the crankshaft 68, which causes one step of movement of trays $t$ and then a simultaneous actuation of the pump mechanisms 69 and 72 of depositors C and B, respectively, also causes an actuation of the cherry depositor such that one row of cherries is deposited in a row of molds $m$ in trays $t$, while the latter are at rest.

In my prior patent, I disclosed the tray feeding means as movable intermittently by steps equal in length to the length of a tray $t$ plus the distance between a pair of adjacent trays and the cherry feeding means as movable when the trays move and proportionately thereto, except that the cherry feeding means was caused to stop before the tray feeding means in order to prevent the deposit of rows of cherries in the space between a pair of adjacent trays. The rows of cherries were deposited while the receiving molds were in motion. In the present case, the cherries are deposited while the receiving molds are at rest. This change in manner of operation, while necessary because of the location of the cherry feeder between depositors B and C, is important as better calculated to insure that the cherries drop accurately into their molds. The feeder of my copending application moved very closely adjacent to the receiving mold to insure the described result. With the present scheme such close relationship between the molds and cherry feeder is unnecessary and the feeder can be raised, as shown, to secure a drop of the cherries through a sufficient distance to enable them to become embedded in the cream deposits $d$. Also the arrangement permits the use of tubes, such as 34, which could not be used with the feeder of my prior application.

In practice, the crank 80 is adjusted angularly on its shaft 79 so as to initiate a step of movement of the cherry feeder shortly before the trays come to rest. This will be apparent from a comparison of Figs. 1$^a$ and 1$^b$. In the latter figure, the tray feeding mechanism is shown at the very end of its working or tray feeding stroke while from Fig. 1$^a$ it will be seen that crank 80 has already commenced its working stroke. The cherry feeding conveyer has therefore moved part way but not enough to release a row of cherries,—such release occurring shortly after the trays come to rest. The setting of crank 80 may readily be varied to time the deposit of the cherries with relation to the tray movement so that the desired results can be accurately obtained.

In operation, the trays $t$ move forwardly step by step and when one row of molds $m$ in one tray comes to rest in receiving relation with the pump mechanism of depositor B, the corresponding row of another tray $t$ will come to rest in receiving relation with the cherry feeder A and the corresponding row of molds in still another tray will come to rest in receiving relation with the pump mechanism 69 of depositor C. The depositor B will make a row of small deposits $d$ in the lower part of a row of molds $m$. The cherry feeder A will deposit a row of cherries $c$ on top of a row of deposits $d$, previously made in depositor A, and depositor C will eventually make a row of deposits on top of the cherries $c$, covering the same and filling the remainder of the molds $m$.

The cherry feeder is characterized in that the cherries are deposited while the receiving molds are at rest; in that the cherries are expelled from the cherry feeder by positively-acting means; in that the momentum acquired by the cherries due to their movement with the cherry conveyer is prevented with interfering with the accuracy of fall of the cherries through the contemplated paths and into molds $m$; and in that guiding means are provided for directing the cherries in case they are to fall through long paths to secure the embedding of the cherries in the cream.

The invention has been disclosed herein, in an embodiment at present preferred, for illustrative purposes but the scope of the invention is defined by the appended claims rather than by the foregoing description.

What I claim is:

1. Article feeding mechanism, comprising, in combination with conveying means to which the articles are to be fed, a conveyer mounted to move during part of its lower course of travel in a path above that of said means, said conveyer having a series of longitudinally spaced pockets in its outer face in which pockets the articles are placed while the pockets are travelling open end up, means for successively closing the pockets after they have been filled in order to retain the articles therein while the pockets are travelling open end down, means for successively opening said pockets as they successively arrive at a predetermined point in said path to release the articles so that they may fall upon said conveying means, and positively-acting means operable as the pockets are opened to expel the articles from the pockets.

2. Article feeding mechanism, comprising, in combination with conveying means to which the articles are to be fed, a conveyer mounted to move during part of its lower course of travel in a path above that of said means, said conveyer having a series of longitudinally spaced pockets in its outer face in which pockets the articles are placed while the pockets are travelling open end up, a belt mounted to move in part of its course of travel in contiguous relation with the outer face of said conveyer for the purpose of successively closing said pockets after they have been filled and holding them closed while the pockets are travelling open end down and until they successively arrive at a predetermined point in said path when the belt moves away from the conveyer to successively open the pockets and allow the articles to successively fall therefrom and upon said conveying means, and positively-acting means operable as each pocket is uncovered to expel the article therefrom.

3. Article feeding mechanism, comprising, in combination with conveying means to which the articles are to be fed, a conveyer mounted to move during part of its lower course of travel in a path above that of said means, said conveyer having a series of longitudinally spaced pockets in its outer face in which pockets the articles are placed while the pockets are travelling open end up; a belt mounted to move in part of its course of travel in contiguous relation with the outer face of said conveyer for the purpose of successively closing said pockets after they have bene filled and holding them closed, while the pockets are travelling open end down and until they successively arrive at a predetermined point in said path, when the belt moves away from the conveyer to successively open the pockets and allow the articles to successively fall therefrom and upon said conveying means; and means in the nature of a barrier to prevent the articles as they successively fall from said pockets from being deflected forwardly out of the desired vertical path of fall by reason of the momentum acquired by moving with said conveyer.

4. Article feeding mechanism, comprising, in combination with conveying means to which the articles are to be fed, a conveyer mounted to move during part of its lower course of travel in a path above that of said means, said conveyer having a series of longitudinally spaced pockets in its outer face in which pockets the articles are placed while the pockets are travelling open end up; a belt mounted to move during part of its course of travel in contiguous relation with the outer face of said conveyer for the purpose of successively closing said pockets after they have been filled and holding them closed, while the pockets are travelling open end down and until they successively arrive at a predetermined point in said path, when the belt moves away from the conveyer to successively open the pockets and allow the articles to successively fall therefrom and upon said conveying means; and means for guiding the articles in a predetermined path as they fall from said conveyer to said conveying means.

5. Mechanism for feeding cherries or the like in rows to rows of molds, comprising, a travelling carrier on which the molds are arranged in transverse rows spaced longitudinally from each other, a conveyer mounted to move during part of its lower course of travel in a path above that of said molds and having in its outer face a series of longitudinally-spaced transversely-disposed rows of pockets into which the cherries are placed while the pockets are travelling open end up; a belt mounted to move during part of its course of travel in contiguous relation with the outer face of said conveyer and serving to successively close the rows of pockets after they have been filled and to hold them closed, while they are travelling open end down until the rows successively arrive at a predetermined point in said first named path, when the belt moves away from the conveyer to successively uncover the rows of pockets; and positively-acting means operable as each row of pockets is successively uncovered to insure that the cherries are expelled from the pockets and started on their flight toward the underlying molds on said carrier.

6. Mechanism for feeding cherries or the like in rows to rows of molds, comprising, a travelling carrier on which the molds are arranged in transverse rows spaced longitudinally from each other, a conveyer mounted to move during part of its lower course of travel in a path above that of said molds and having in its outer face a series of longitudinally-spaced transversely-disposed rows of pockets into which the cherries are placed while the pockets are travelling open end up; a belt mounted to move during part of its course of travel in contiguous relation with the outer face of said conveyer and serving to successively close the rows of pockets after they have been filled and to hold them closed, while they are travelling open end down until the rows successively arrive at a predetermined point in said first named path, when the belt moves away from the conveyer to successively uncover the rows of pockets; and means for preventing the cherries from being carried forwardly by the momentum acquired from travelling with said conveyer as they fall from the opened pockets and forcing them to fall vertically into the underlying molds on said carrier.

7. Mechanism for feeding cherries or the like in rows to rows of molds, comprising, a travelling carrier on which the molds are arranged in transverse rows spaced longitudinally from each other, a conveyer mounted to move during part of its lower course of travel in a path above that of said molds and having in its outer face a series of longitudinally-spaced transversely-disposed rows of pockets into which the cherries are placed while the pockets are travelling open end up; a belt mounted to move during part of its course of travel in contiguous relation with the outer face of said conveyer and serving to successively close the rows of pockets after they have been filled and to hold them closed, while they are travelling open end down until the rows successively arrive at a predetermined point in said first named path, when the belt moves away from the conveyer to successively uncover the rows of pockets, and means affording a transverse row of passages extending from said conveyer to the underlying molds into which row of passages a row of cherries fall as its row of pockets is uncovered and by which the cherries are carried in definite paths into the underlying row of molds.

8. Article feeding mechanism, comprising, an endless conveyer having article receiving pockets in its outer face, means for filling the pockets in said conveyer during its upper course of travel, a belt moving in part of its course of travel in contiguous relation with the outer face of said conveyer for the purpose of closing said pockets after they have been filled and for holding them closed while the pockets are travelling open end down until they successively arrive at a predetermined point in the lower course of travel of said conveyer when the belt moves away from the latter and opens the pockets, and positively-acting means cooperating successively with the pockets as each is uncovered to expel the article therefrom, said last named means effective to enter a pocket only after the pocket has been uncovered.

In testimony whereof I have affixed my signature.

ALONZO LINTON BAUSMAN.